United States Patent [19]

Tsuchiya et al.

[11] Patent Number: 5,800,015
[45] Date of Patent: Sep. 1, 1998

[54] LONG SLIDE RAIL DEVICE FOR VEHICLE SEAT

[75] Inventors: Kenji Tsuchiya; Tamotsu Shirai; Akira Nemoto, all of Akishima, Japan

[73] Assignee: Tachi-S Co., Ltd., Tokyo, Japan

[21] Appl. No.: 732,149

[22] Filed: Oct. 16, 1996

[51] Int. Cl.⁶ .................................................. B60N 2/12
[52] U.S. Cl. ..................... 297/331; 297/335; 297/340; 297/344.1; 297/324; 248/430; 248/65.1
[58] Field of Search ...................... 297/324, 340, 297/344.1, 331, 334, 335; 248/429, 430, 393, 395; 296/65.1

[56] References Cited

U.S. PATENT DOCUMENTS

| | | | |
|---|---|---|---|
| 4,941,636 | 7/1990 | Fujiwara et al. | 248/430 |
| 4,949,931 | 8/1990 | Fujiwara et al. | 248/429 |
| 5,156,437 | 10/1992 | Hayakawa et al. | 297/344.1 |
| 5,372,398 | 12/1994 | Aneiros et al. | 248/430 |
| 5,529,378 | 6/1996 | Chaban et al. | 297/331 |

FOREIGN PATENT DOCUMENTS

(A) 6-336131  12/1994  Japan .
(U) 7-37776   7/1995   Japan .
(U) 7-40250   7/1995   Japan .
(A) 8-230530  9/1996   Japan .

*Primary Examiner*—Peter M. Cuomo
*Assistant Examiner*—Anthony D. Barfield
*Attorney, Agent, or Firm*—Browdy and Neimark

[57] ABSTRACT

A long slide rail device for vehicle seat, which includes a temporary lock mechanism for temporarily locking an upper rail member fixed to the seat, at a predetermined temporary lock point, relative to a long lower rail member fixed in a floor of vehicle, so that the seat may be temporarily locked at that point, allowing its seat cushion to be folded upright to its seat back, before being displaced to a storage lock position. The temporary lock mechanism includes a female lock element (or female lock hole) provided in the lower rail member at the temporary lock point, and a male lock element so arranged at the upper rail element as to lie generally within the long lower rail member and movable for engagement with and disengagement from the female lock element. Thus, the structure of long slide rail device is simplified in structure and made small in sizes. Also, the temporary lock mechanism is provided with a connecting portion for allowing operative connection with other locking mechanism for locking the seat cushion or seat back at the temporary lock point in an interlocking relation therewith.

19 Claims, 5 Drawing Sheets

LONG SLIDE RAIL DEVICE FOR VEHICLE SEAT

BACKGROUND OF INVENTION

1. Field of the Invention

The present invention relates to a long slide rail device for adjustment in position of a vehicle or automotive seat relative to an elongated or long lower rail member in the fore-and-aft direction of a vehicle or automobile, and is in particular directed to a long slide rail device of the type that the seat (especially a rear seat, including a second or third rear seat) may be temporarily stopped at a predetermined point before being displaced to and stored at a storage position.

2. Description of Prior Art

A long slide rail is constructed in an elongated fashion relative to an ordinary slide rail, so that it may be installed in a relatively large area of a vehicle or automobile for adjustment in position of a seat in the fore-and-aft direction thereof. Typically, this sort of slide rail is used in a such vehicle as a van- or wagon-type automobile, for slidable adjustment of a rear seat (including a second or third rear seat) in position on a rearward floor area of the vehicle to widen a space there for load-carrying or other various purposes.

Figure 1:
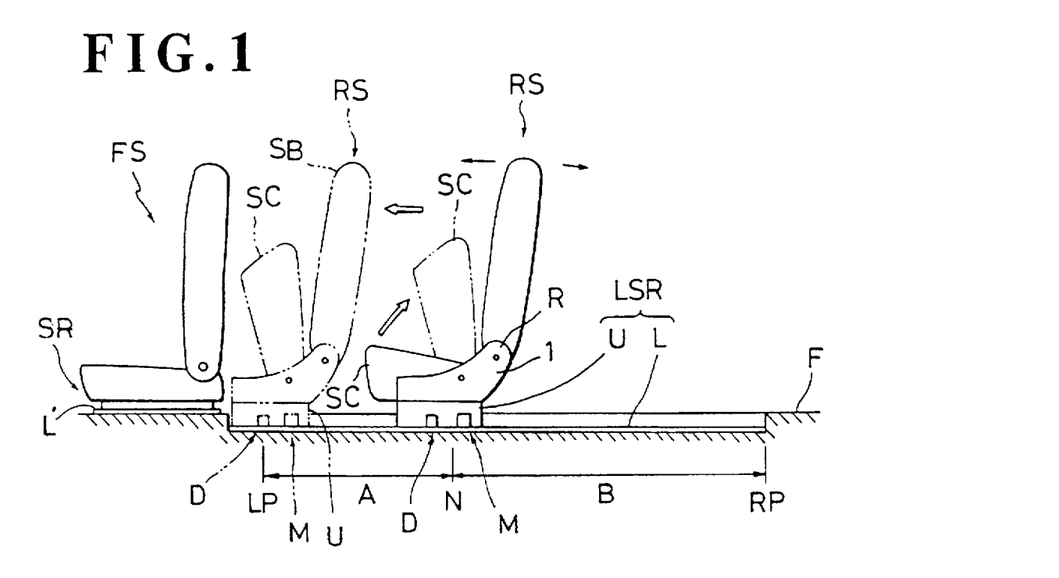
FIG. 1 is a schematic diagram showing the operation of a long slide rail device in accordance with the present invention.

Generally, in this long slide rail, an elongated or long lower rail member is provided, which extends on a floor in the rearward section (or load-carrying area) of vehicle in the whole length thereof, with an ordinary short length of upper rail member being slidably fitted in that long lower rail member. For instance, FIG. 1 shows such long slide rail construction, from which it is seen that a rear seat (RS) is provided with a long lower rail member (L) and a short upper rail member (U) fitted therein, which is a typical example of contrast to an ordinary size of slide rail (SR) used in a front seat (FS).

Further, some of the seats of this kind slidable along the long lower rail member are provided with a temporary locking mechanism for allowing the seat or rear seat to be temporarily stopped on the long lower rail member at a predetermined point between a foremost storage lock position and a rearward floor area in a vehicle. Referring to FIG. 1 for example, such predetermined point can be understood by the designation (N) and the storage lock position and rearward floor area be understood by the designations (LP) (B). Use of this temporary locking mechanism is effective in drawing the attention of a passenger through the temporary stopping or locking of rear seat at the point (N) so that he or she may assure to fold a seat cushion of the rear seat upwardly to a seat back of the same into a folded from before displacing the seat to the storage lock position (LP).

Conventionally, the temporary locking mechanism has been assembled between the upper rail member and long lower rail member, together with an auxiliary rail member provided in the floor of vehicle alongside the long lower rail member, as disclosed from the Japanese Laid-Open Patent Pub. No. 7-304368, wherein a device for locking the seat cushion against upward folding to the seat back is additionally provided between the auxiliary rail member and another additional upper rail member fixed at the seat cushion. Such construction has been found defective in that the whole slide rail is much complicated and increases its weight as well as its dimensions, thus resulting in a troublesome, time-consuming assemblage thereof and not attaining a wide space in the rearward floor area of vehicle. Moreover, according to such Japanese prior art, the auxiliary rail member needs affixing a cover element on the upper side thereof exposed from the floor in order to prevent invasion of dusts and foreign materials into within the auxiliary rail member, and also the cover element is prone to damages due to its frequent contacts with a passenger's foot or a baggage loaded thereon.

SUMMARY OF THE INVENTION

In view of the above-stated drawbacks, it is a primary purpose of the present invention to provide an improved long slide rail device for a vehicle seat which is simplified in structure and made small in sizes.

In order to achieve such purpose, the long slide rail device in accordance with the present invention is basically comprised of:

- an elongated or long lower rail means to be fixed in a floor of a vehicle, in which long lower rail means, a predetermined point is defined for a seat cushion of the seat to be folded upright towards a seat back of the seat;
- an upper rail means to be fixed to the seat cushion, which upper rail means is slidably fitted in the long lower rail means; and
- a locking means for locking and unlocking the upper rail means at the foregoing predetermined point in the long lower rail means, the locking means including:
  - a female lock means provided in the long lower rail means at the predetermined point; and
  - a male lock means so mounted on the upper rail means as to be movable in a direction for engagement with and disengagement from the female lock means.

Accordingly, the locking means is disposed in the lower and upper rail means, allowing its size to be made small and also allowing its structure to be simplified, without need for preparing other sub rail assemblies or the like as in the prior art.

In ordinary, the predetermined point is defined between a storage lock position where said seat is to be stored and locked, with the seat cushion thereof folded upright, and a seating adjustment area where said seat is to be moved for adjustment in position in a fore-and-aft direction of the vehicle. Thus, the locking means may be a temporary locking mechanism for temporarily locking the seat at that predetermined point before displacing the seat to the storage lock position, and may be so arranged between the upper and long lower rail means that the male lock means is normally retained in a condition ready for engagement with the female lock means and may be disengaged from the female lock means.

Preferably, the male lock means may be so arranged on the upper rail means as to lie generally along a longitudinal direction of the upper rail means and be accommodated generally within the lower rail means. For that purpose, the upper rail means may include a vertical slide section slidably fitted in the long lower rail means, with a cut-away area formed in such vertical slide section, and the male lock means may be arranged in the cut-away area such as to lie generally within a height-wise width of and along a longitudinal direction of the vertical slide section of upper rail means and further rotatable vertically in the cut-away area for engagement with and disengagement with the female lock means. For instance, the male lock means may be so configured as to have a slide end at a lower end thereof for a slidable contact upon a bottom wall of the long lower rail means, or so configured as to hang over the cut-away area and extend adjacently along two opposite sides of the vertical slide section of upper rail means, terminating in a pair of slide ends for the same slidable contact on the bottom wall. In this connection, the female lock means may be defined in such bottom wall of long lower rail means at a point corresponding to the foregoing predetermined point, and also may be formed either in the form of a solid lock member or in the form of a lock hole, for engagement with the male lock means at that point.

It is a second purpose of the present invention to permit the above-described long slide rail device to be interlocked with other locking mechanisms for locking the seat cushion or seat back.

To this end, the male lock means is provided with a connecting means for allowing operative connection of the male lock means with, for example, a seat cushion locking means for locking and unlocking the seat cushion to and from a normal horizontal use position, with such an arrangement that, when the male lock means is engaged with the female lock means at the predetermined point, the seat cushion locking means is operable to unlock the seat cushion from the normal horizontal use position for upright folding to the seat back, and when the seat cushion is folded upright, the seat cushion locking means acts on such connecting means, allowing the male lock means to be disengaged from the female lock means.

Other features and advantages of the invention will become apparent from reading of the descriptions hereinafter, with reference to the drawings.

DETAILED DESCRIPTION OF PREFERRED EMBODIMENTS OF THE INVENTION

Referring to FIGS. 1 through 8, there is illustrated a long slide rail device in accordance with the present invention, as generally designated by (LSR), which typically includes an elongated or long lower rail member (L) and an upper rail member (U). The long lower rail member (L) is fixed in the floor (F) of a vehicle, while on the other hand, the upper rail member (U) is fixed via a side frame (1) to the bottom side of a seat cushion (SC) of a rear seat (RS).

Although not shown, as with the common arrangement of slide rails in the art, it may be understood that a pair of such long slide rail devices (LSR) are provided between the rear seat (RS) and floor (F). The illustrations in the drawings show only one long slide rail device (LSR) to simplify the figures thereof since description will also be given as to only one long slide rail device (LSR) for the sake of simplicity.

FIG. 1 shows, in the side elevation, a general whole appearance of the long slide rail device (LSR) arranged in a vehicle or automobile. It is seen therefrom that, as already stated earlier, the lower rail member (L) is of a greater length relative to that (L') of an ordinary slide rail device (SR) used in a front seat (FS), and that the long slide rail device (LSR) permits the rear seat (RS) (or plural rear seats) to be adjustably moved in a space behind the front seat (FS), i.e. in a rearward cabin section (or a load-carrying area) of a vehicle, along the fore-and-aft direction of the vehicle as indicated by the arrows.

In accordance with the present invention, a temporary locking mechanism (M) and a locking device (D) are both disposed at an upper rail member (U) in order to temporarily lock the rear seat (RS) at a predetermined home seating position (N) in the long lower rail member (L) and finally lock the rear seat (RS) at a storage lock position (LP), with the seat cushion (SC) thereof folded upright as shown in FIG. 1. As described in the description of prior art, in the interior of van- or wagon-type automobile or the like, there are defined the home seating position (N) where the rear seat (RS) is normally positioned near to the front seat (FS), allowing a passenger to sit thereon with his or her normal posture behind the front seat (FS), and the storage lock position (LP) where the rear seat (RS) may be locked and stored right behind the front seat (FS). Designation (A) stands for a forward movable limit region where the rear seat (RS) may be further moved in a forward direction towards the storage lock position (LP), with the seat cushion (SC) folded upright to the seat back (SB). This particular area (A) is therefore what is called a "Fold Seat Cushion Upright" area, in which the folding of the seat cushion (SC) upright to the seat back (SB) is required as a condition for allowing the rear seat (RS) to move toward the storage lock position (LP) after unlocking operation of the temporary locking mechanism (M). In that sense, such "Fold Seat Cushion Upright" area (A) is also well perceivable by a passenger as a non-seating area, as no sufficient space is available there for the passenger to sit on the seat (RS), which helps to avoid his or her careless unstable sitting thereon within that area (A).

Designation (B) stands for a seating position adjustment area in which the rear seat (RS) may be adjustably moved in the fore-and-aft direction along the long lower rail member (L) between the home seating position (N) and the rearmost position (RP) by operation of the lock device (D).

Figure 2:
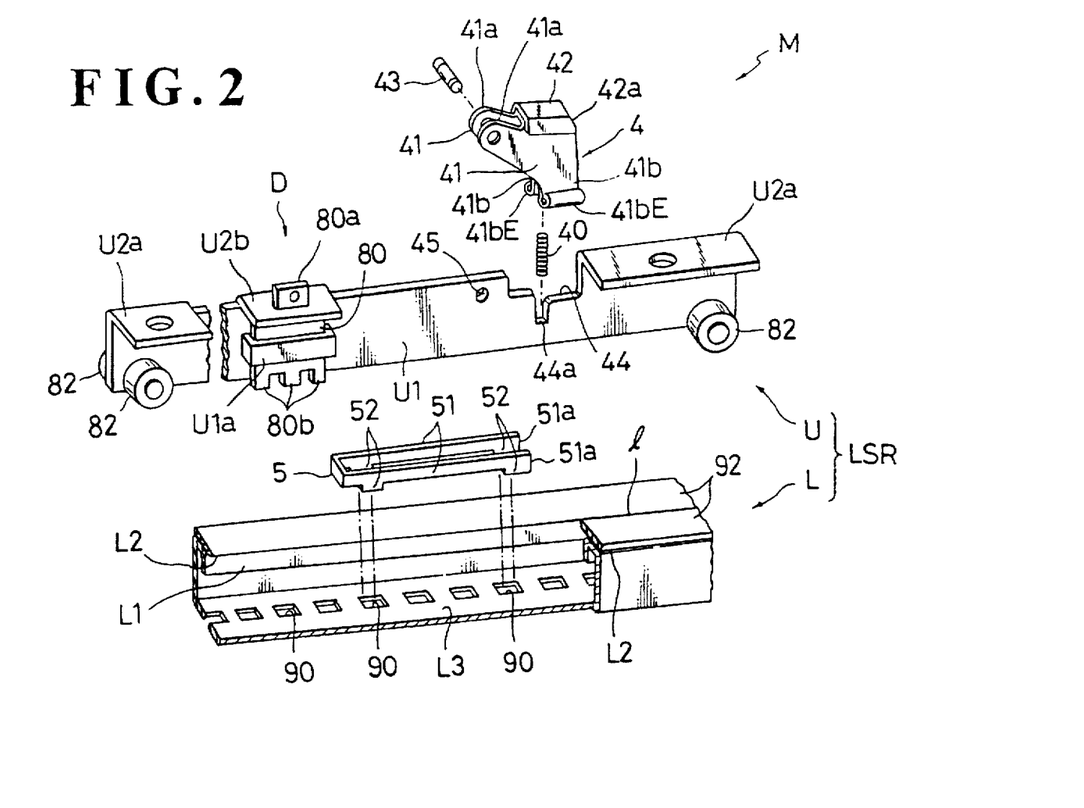
FIG. 2 is a partly broken schematic perspective view of one mode of the long slide rail device.
Figure 6:
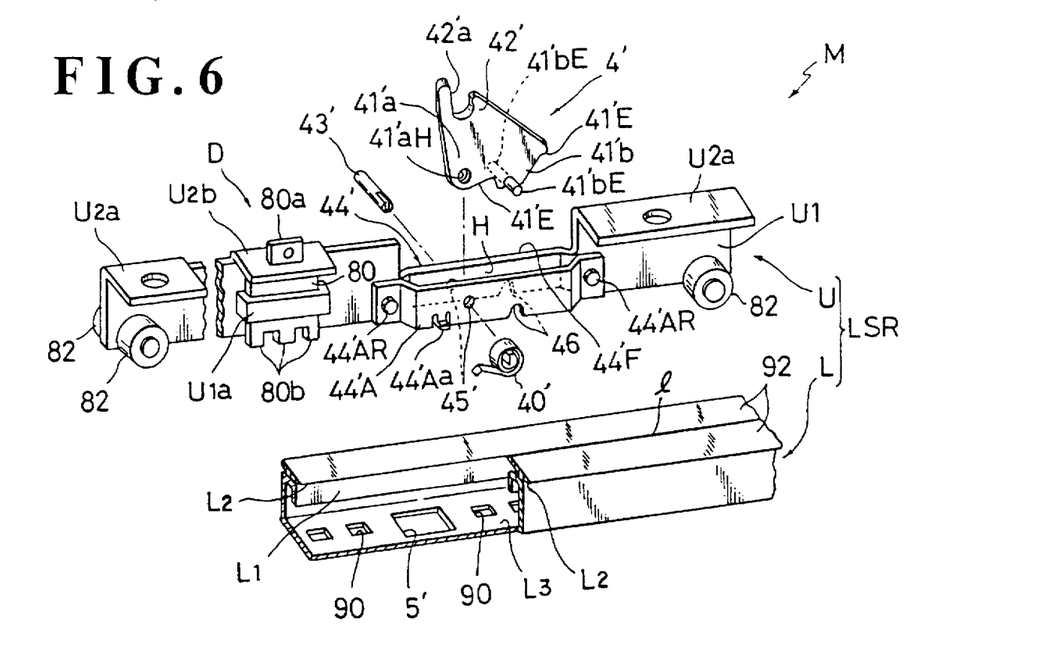
FIG. 6 is a partly broken schematic perspective view of an alternate mode of long slide rail device.

In accordance with the present invention, an improved long slide rail device (LSR) is provided, which is capable of the above-described locking and adjustment of rear seat (RS), with a temporary locking mechanism (M) arranged between the upper rail member (U) and one particular point of lower rail member (L) corresponding to the foregoing home seating position (N). FIGS. 2 and 6 show first and second embodiments this long slide device (LSR), respectively, both of which attain a common purpose of the present invention to provide a simplified structure and insure the upright folding of seat cushion (SC) in cooperation with the temporary locking of rear seat (RS) at the home seating position (N). In this respect, it will be understood that, as far as the temporary locking mechanism (M) is concerned, those two embodiments have a non-distinctive basic concept for alteration with each other within the generic scope and gist of the present invention.

Also, for both of the two embodiments, the upper and long lower rail members (U)(L) used are basically of the same configuration having a same lock device (D) provided therein. Namely, as shown in FIGS. 1 through 8, the long lower rail member (L) used is formed in a generally "U" shape in cross-section to have a pair of spaced-apart upper walls (L2)(L2), a guide groove (L1) defined therebetween and a bottom wall (L3). As can be seen in FIG. 1, the long lower rail member (L) is fixedly embedded in the floor (F) of a vehicle such that the upper walls (L2)(L2) thereof are only exposed an the flat surface of floor (F). A pair of elastic cover elements (92)(92), each being made of an elastic synthetic resin material, are fixed on the respective two upper walls (L2)(L2) of lower rail member (L) in such a fashion as to contact with each other resiliently at the line (l) extending along the longitudinal direction of the guide groove (L1) of lower rail member (L), so as to prevent invasion of dusts and foreign materials into the inside of lower rail member (L). In the bottom wall (L3) of lower rail member (L), a plurality of equidistant lock holes (90) are perforated along the longitudinal direction thereof.

Figure 3:
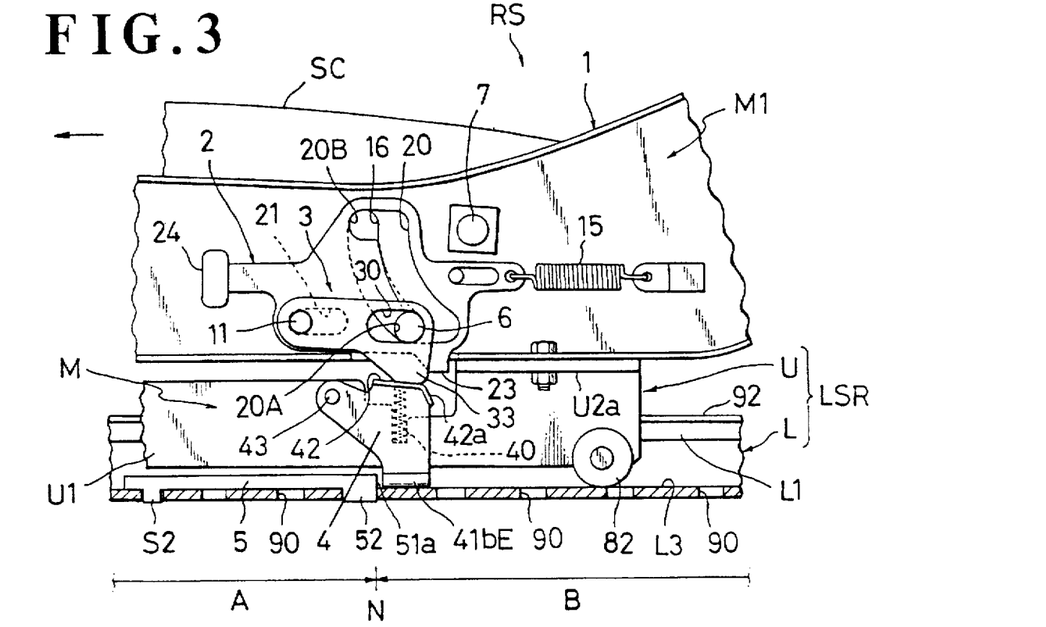
FIG. 3 is a partly broken fragmentary side view of such one mode of long slide rail device, which shows the seat to be temporarily locked.

The upper rail member (U) is formed from a rigid plate material in the illustrated manner, which basically comprises a vertical slide section (U1), a pair of spaced-apart horizontal connecting sections (U2a) and a horizontal support section (U2b), wherein all those horizontal sections (U2a, U2b) extend at a right angle from the upper end of vertical slide section (U1) on a horizontal plane. A plurality of rollers (82) are rotatably mounted on the vertical slide section (U1) of upper rail member (U). The upper rail member (U) is fixed to the side frame (1) of rear seat (RS) by firmly fastening the two horizontal connecting sections (U2a) to the lower end of such slide frame (1), by use of bolts and nuts, as can be seen in FIG. 3.

The upper rail member (U) is provided with a lock device (D) at the horizontal support section (U2b) thereof, which is adapted to lock and unlock the upper rail member (U) relative to the lower rail member (L). The lock device (D) itself is of a known construction including a lock plate (80) having three engagement teeth (80b) projecting from the lower end thereof. The lock plate (80) is movably supported by a bracket (U1a) formed integrally on the vertical slide section (U1) such as to be movable in a vertical direction through for the purpose of its engagement into and disengagement from the corresponding set of three lock holes (90) lower rail member (L). A connecting lug portion (80a) is formed on the upper end of that lock plate (80) for operative connection with an actuator lever (R) (See FIG. 5) associated with an operation mechanism (not shown) of the lock device (D).

As shown, the upper rail member (U) is slidably assembled with the lower rail member (L) such that the vertical slide section (U1) of the former (U) is slidably fitted in and along the guide groove (L1) of the latter (L).

Within generic concept of the present invention the temporary locking mechanism (M) may be based on a simplified construction comprising a rotatable male lock element (4 or 4') rotatably mounted the vertical slide section (U1) of upper rail member (U) and a stationary female lock element (5 or 5') fixed at a predetermined point in the long lower rail member (L) which corresponds to the aforementioned home seating position (N). The rotatable male lock element is so pivoted on the upper rail member (U) as to be engaged with and disengaged from the stationary female lock element (5) fixed at the lower rail member (L) when the rear seat (RS) is located at the home seating position (N). Further, the rotatable male lock element is operatively connectable with another locking mechanism (M1 or M2) for locking and unlocking the seat cushion (SC) of rear seat (RS) in conjunction with the operation of temporary locking mechanism (M) so as to insure that the seat cushion (SC) may be folded upwardly to the seat back (SB) when the seat (RS) is released from the temporary locked state at the position (N), and displaced in the "Fold Seat Cushion Upright" area (A) towards the storage lock position (LP).

Now, reference is first made to the first embodiment of the long slide device (LSR) shown in FIGS. 2 to 5. According thereto, the above-defined temporary locking mechanism (M) is embodied by: a rotary male lock member (4); a cut-away mount area (44) formed in the vertical slide section (U1) of upper rail member (U); and a stationary female lock member (5) secured on the bottom wall (L3) of long lower rail member (L).

The rotary male lock member (4) is shown in FIG. 2 to have a generally L-shaped configuration formed by a top connecting portion (42) and a pair of spaced-apart generally L-shaped vertical portions (41)(41) each integrally extending downwards from both sides of the to connecting portion (42). Each of those two L-shaped vertical portions (41)(41) has, formed therein, an upper pivotal base part (41a) and a lower lock part (41b), wherein the lower lock part (41b) extends downwardly from the upper pivotal base part (41a) and terminates in a cylindrical slide engagement end (41bE) which is formed by upturning or curling the corresponding lowermost end area of lower lock part (41b). The top connecting portion (42) is provided with a sloped surface area (42a) at a side thereof opposite to the two pivotal base parts (41a)(41a) associated with the paired vertical portions (41)(41).

Figure 4:
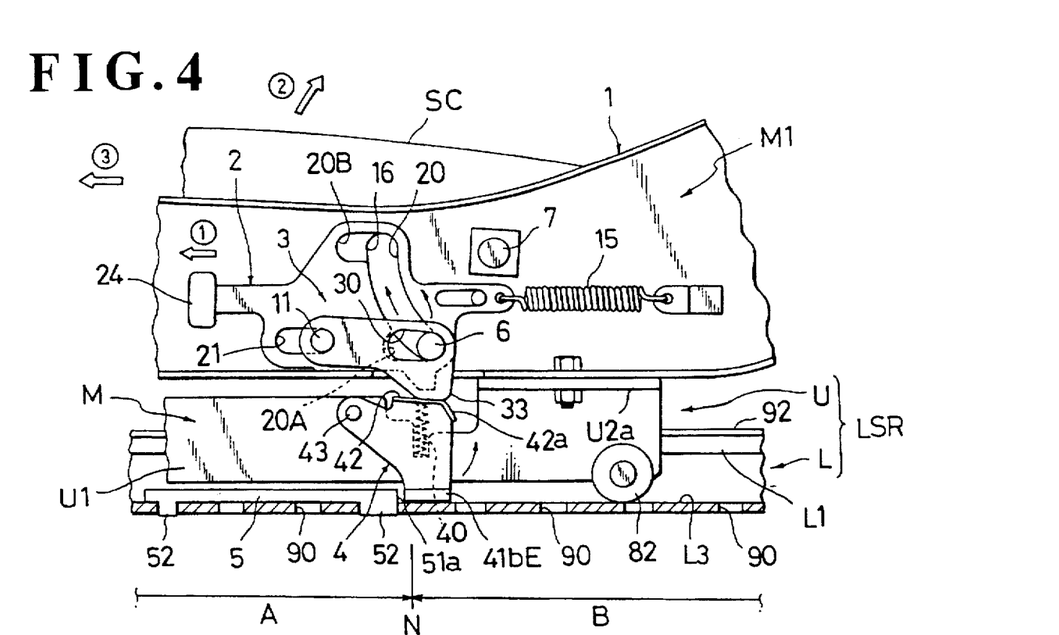
FIG. 4 is a partly broken fragmentary side view of such one mode of long slide rail device, which shows unlocking operation of a seat cushion locking mechanism.
Figure 5:
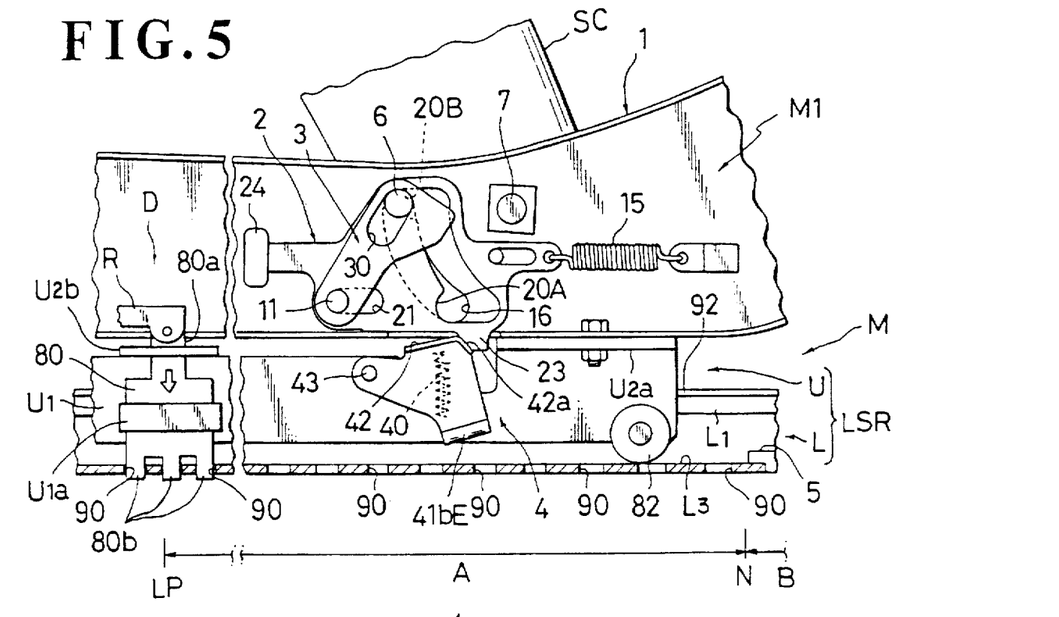
FIG. 5 is a partly broken fragmentary side view of such one mode of long slide rail device, which shows the seat to be released from a temporarily locked state and displaced to the storage lock position.

The above-described rotary male lock member (4) is mounted at the cut-away mount area (44) of upper rail member (U), such that the two upper pivotal base parts (41a)(41a) thereof are rotatably connected via a pin (43) to a hole (45) formed in the vertical slide section (U2) adjacent to the cut-away area (44). Thus, the male lock member (4) is free to rotate about the pin (43) vertically in such a manner as to hang over the vertical slide section (U1) of upper rail member (U), with the two vertical portions (41)(41) thereof extending adjacently alongside the respective side surfaces of vertical slide section (U1). As seen in FIGS. 3, 4 and 5, the male lock member (4) may be rotated downwardly to bring its two cylindrical slide ends (41bE) into contact upon the bottom wall (L3) of lower rail member (L).

It is to be appreciated that the rotary male lock member (4) may be mounted to the upper rail member (U) as if it was an integral part of the vertical slide section (U1) of upper rail member (U) and thus can be slidably set in and along the guide groove (L1) of long lower rail member (U), as understandable from FIG. 3. Also, the cut-away area (44) permits vertical rotation of the lock member (4) generally within the height-wise width of the upper rail member vertical slide section (U1).

A coil spring (40) is interposed between this rotary male lock member (4) and the notch portion (44a) of cut-away area (44) to biasingly cause the male lock member (4) to rotate about the pin (43) upwardly so that the top end portion (42) of the lock member (4) is normally biased in an upward direction towards a seat cushion locking mechanism (M1) provided at the side frame (1) of rear seat (RS).

As shown in FIG. 2, the stationary female lock member (5) is formed in a generally "U" shape having a pair of spaced-apart longitudinal sections (51)(51), each terminating in an engagement edge (51a) which is to be engaged with the cylindrical slide engagement edge (41bE) of rotary male lock member (4) as will be described later. Two pairs of spaced-apart securing lugs (52) are formed dependent from those two longitudinal sections (51) of female lock member (5), respectively. The female lock member (5) is fixed to the bottom wall (L3) of long lower rail member (L) by welding such two sets of lugs (52) thereof to the respective mating pair of predetermined lock holes (90) which are defined at a point corresponding to the aforementioned home seating position (N). It is noted here that the U-shaped configuration of female lock member (5) and formation of the spaced-apart securing lugs (52) therein avoids closing other lock holes (90) to provide a sufficient opening in such lock holes (90) for the lock tooth (80b) of lock device (D) to engage therein. It is also noted that the female lock member (5) projects from the lower rail member bottom wall (L3) to a level below the lower edge of upper rail member vertical slide section (U1), thereby avoiding contact and interference between the female lock member (5) and upper rail member (U).

As shown in FIG. 3, a seat cushion locking mechanism (M1) may be arranged at the seat cushion (SC) of rear seat (RS) in an interlocking relation with the above-constructed temporary locking mechanism (M). The seat cushion locking mechanism (M1) is movably mounted at the planar lateral surface of side frame (1), as illustrated, and comprises a slidable lock plate (2) having a knob (24), which is slidable along the side frame (1), and a rotary lock plate (3) rotatable about a pin (11) fixed on the side frame (1). The seat cushion (SC) is pivotally connected via a shaft (7) to the side frame (1) and has a guide pin (6) projecting laterally thereof. The side frame (1) has an arcuate guide hole (16) through which the guide pin (6) slidably passes. The rotary lock plate (3) is normally placed in such a locking position as in FIG. 3 where its projected end (33) contacts the top connecting portion (42) of rotary lock member (4) associated with the temporary locking mechanism (M). The slidable lock plate (2) is normally biased by a spring (15) towards a locking position shown in FIG. 3 and may be slid from such locking position to an unlocking position shown in FIG. 4 against the contracting force of spring (15).

The operation of this particular mode of long slide rail device (LSR) will now be described hereinafter.

In the seating position adjustment area (B), the rear seat (RS) may be adjusted at a desired position in the fore-and-aft direction along the long lower rail member (L) by operating the lock device (D) to engage the three lock teeth (80b) in a selected set of three lock holes (90).

Now, when it is desired to move the rear seat (RS) from that area (B) towards the storage lock position (LP), the lock device (D) may be operated to unlock the upper rail member (U) from the long lower rail member (L), allowing the rear seat (RS) to be movable in the fore-and-aft direction along the lower rail member (L). At this point, as can be seen from FIG. 3, the rotary lock member (4), due to its being pushed downwards by the lock plate (3) of locking mechanism (M1) against the upward biasing force of spring (40), is retained in such a downward level where the two cylindrical slide engagement ends (41bE) thereof are in a slight or slidable contact upon the bottom wall (L3) of long lower rail member (3). Also, the seat cushion (SC) is locked in the ordinary horizontal use position as in FIG. 3 by the reason that its associated guide pin (6) is locked between one end of the elongated hole (30) of rotary lock plate (3) and the lower end (20A) of arcuate guide hole (20) of slide lock plate (2).

When a passenger moves the rear seat (RS) to the home seating position (N), the upper rail member (U) is slidingly moved along the long lower rail member (L), with its two cylindrical slide engagement ends (41bE) being in a sliding contact on the bottom wall (L3) of long lower rail member (L). Then, upon the rear seat (RS) reaching the home seating position (N), as shown in FIG. 3, the two slide engagement ends (41bE) of rotary lock member (4) are contacted and engaged with the respective two engagement edges (51a)(51a) of female engagement member (5), whereby the seat (RS) is temporarily locked at the home seating position (N) before being moved to the storage lock position (LP). Thereafter, as shown in FIG. 4, the knob (24) of slide lock plate (2) associated with the seat cushion locking mechanism (M1) is pulled forwardly as indicated by the arrow ① against the contracting force of spring (15), so that the arcuate hole (20) and its lower end (20A) are simultaneously displaced in the same forward direction to release the guide pin (6) from the locked state shown in FIG. 3, and, in particular, the arcuate hole (20) of slidable lock plate (2) matches to the arcuate hole (16) of side frame (1), thereby providing an opened arcuate passage for the guide pin (6) to slide freely therealong. Then, as indicated by the arrow ① and other plural arrows, the seat cushion (SC) is rotated upwardly about the shaft (7), with the guide pin (6) being slid upwardly along the mutually matched arcuate holes (16)(20), and simultaneous with that upward displacement of guide pin (6), the rotary lock plate (3) is rotated upwardly about the pin (11) out of contact with the top connecting portion (42) of male rotary lock member (4), whereupon the male rotary lock member (4) associated with the locking mechanism (M) is rotated about the pin (43) upwardly under the upward biasing force of spring (40) so as to bring its two engagement ends (41bE) out of engagement with the two respective engagement edges (51) of female lock member (5). At this point, as can be seen in FIG. 5, the seat cushion (SC) is folded upright towards the seat back (SB) (See FIG. 1 as well) and locked as it is by the reason that the guide pin (6) is locked between the elongated hole (30) of rotary lock plate (3) and the upper end (20B) of arcuate hole (20) of slidable lock plate (2). On the other hand, the rotary lock member (4) is biased by the spring (40) upwardly so that its associated sloped surface area (42a) is abutted against the downwardly projected portion (23) of slidable lock plate (2), thereby keeping the two engagement ends (41bE) raised at a level above the stationary female lock member (5). Accordingly, the rear seat (RS) is released from the temporarily locked state at the home seating position (N) and allowed to enter the "Fold Seat Cushion Upright" area (A). When the rear seat (RS) with its seat cushion (SC) folded upright is moved to and reaches the storage lock position (LP), the lock device (D) may be operated to lower the lock plate (80) to engage its three lock teeth (80b) in a predetermined set of three lock holes (90) defined at the storage lock position (LP), as shown in FIG. 5, thereby locking the seat (RS) at the storage point right behind the front seat (FS) as indicated by the two-dot chain line in FIG. 1.

In this context, it is noted that, in the seating position adjustment area (B), the rotary male lock member (4) is retained in such a depressed state as shown in FIG. 3 wherein its slide engagement parts (41bE) are kept in a slidable contact on the bottom wall (L3) of lower rail member (L) to thereby be ready for engagement with the female lock member (5). This is due to the fact that the seat cushion locking mechanism (M1) is operative in that area (B), with its rotary lock plate (3) depressing the rotary lock member (4), and locks the seat cushion (SC) in the normal horizontal use position.

Figure 7:
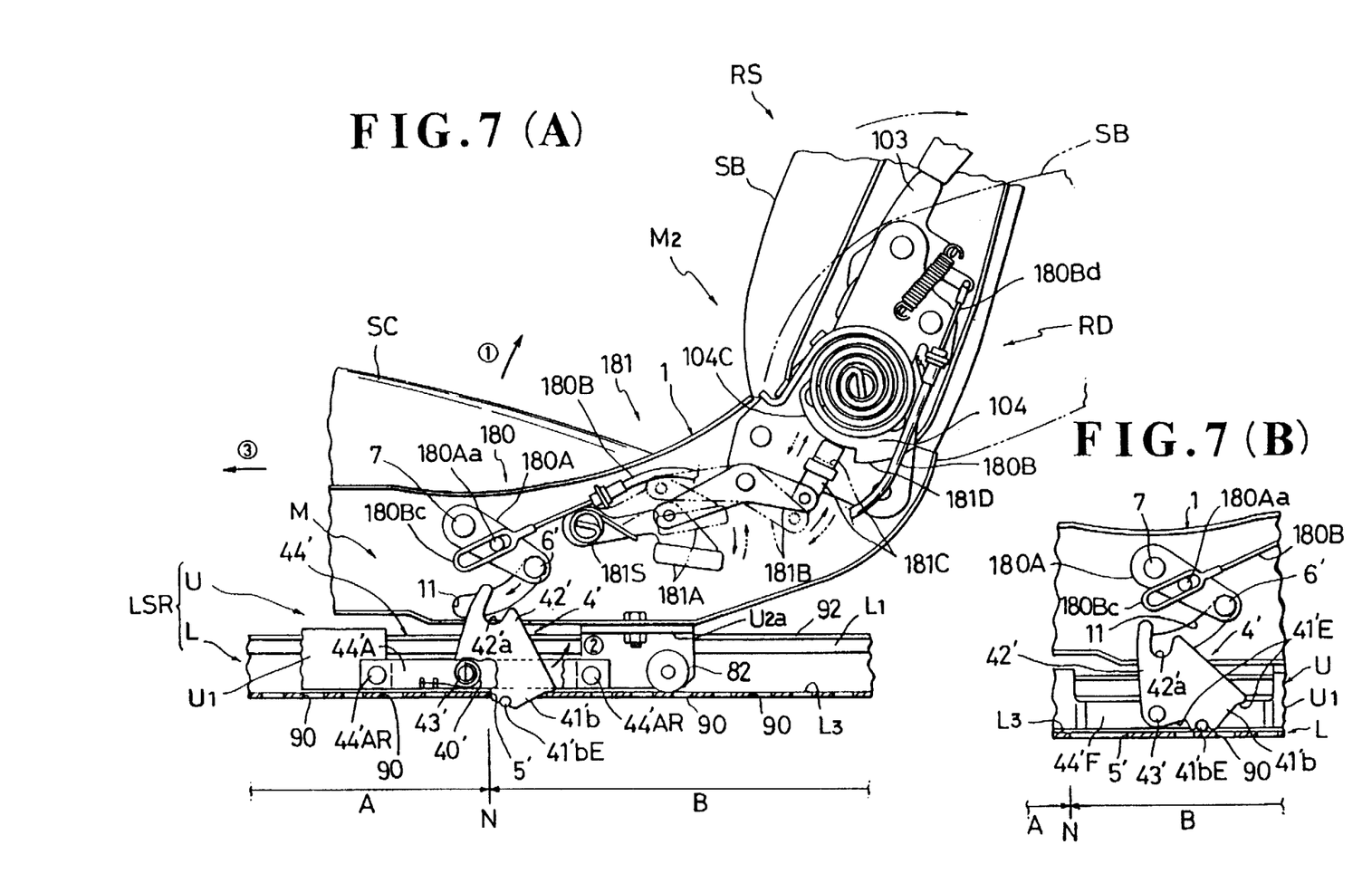
FIG. 7(A) is a partly broken fragmentary side view of such alternate mode of long slide rail device, which shows the seat to be temporarily locked.
FIG. 7(B) is a partially enlarged view of principal part in such alternate mode, showing a rotary male lock member to be slid on the bottom wall of long lower rail member.
Figure 8:
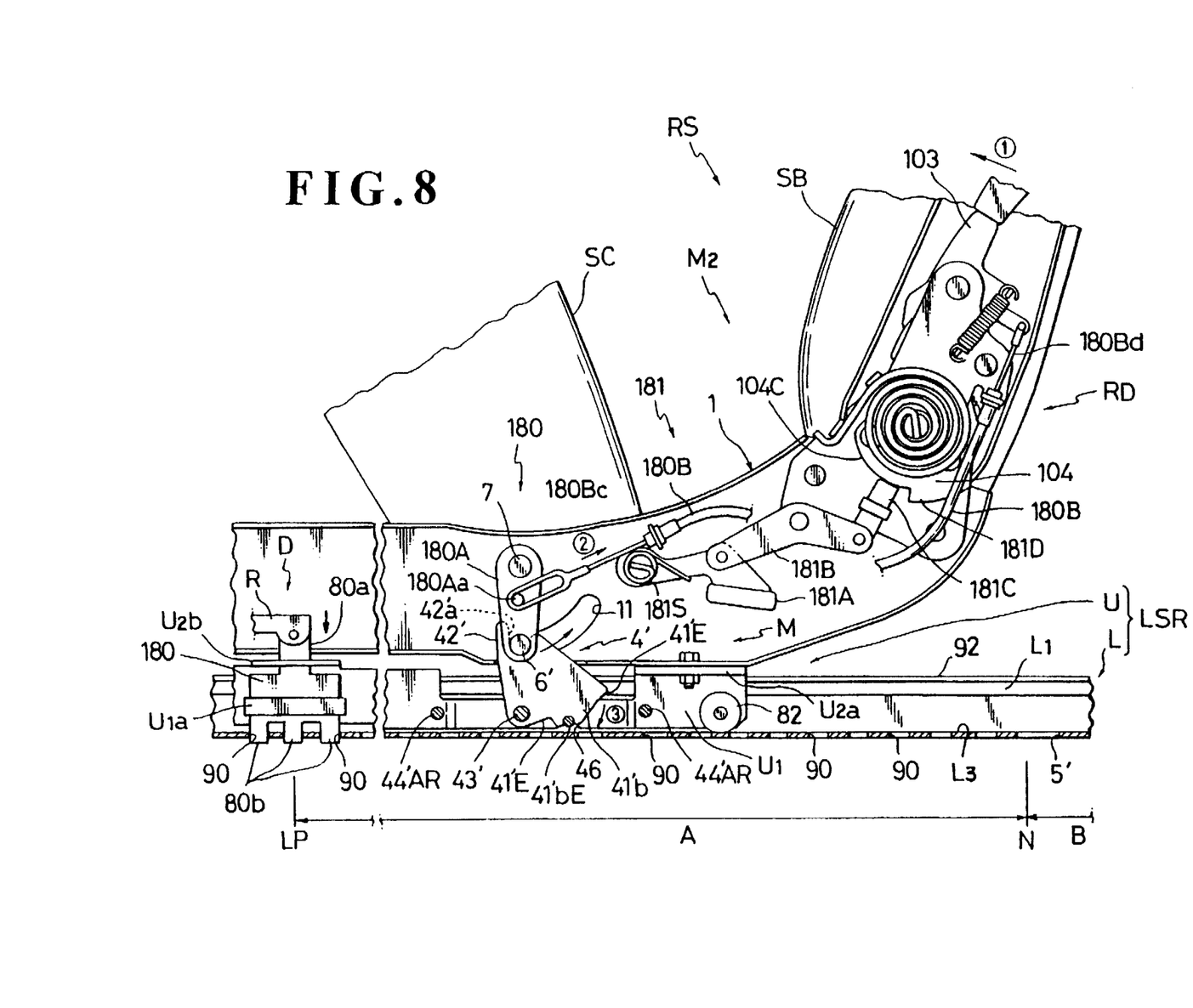
FIG. 8 is a partly broken fragmentary side view of such alternate mode of long slide rail device, which shows the seat to be released from a temporarily locked state and displaced to the storage lock position.

Reference is now made to FIGS. 6 to 8 which a second embodiments of the long slide rail device (LSD).

In the second embodiment the above-defined temporary locking mechanism (M) is embodied by: a rotary male lock member (4'); a cut-away mount area (44') formed in the vertical slide section (U1) of upper rail member (U); and a female temporary lock hole (5') formed in the bottom wall (L3) of long lower rail member (L).

The rotary male lock member (4') is shown in FIG. 6 to be so formed from a generally triangular plate as to have, defined therein, a top connecting portion (42'), a pivotal base part (41'a), and a slide engagement end part (41'b). The top connecting portion (42') is formed with a notch (42'a) and adapted for operative connection with a seat cushion/seat back locking mechanism (M2) (See FIG. 8) as will be described later. The pivotal base part (41'a) has a hole (41'aH) which forms a center of rotation of the rotary male lock member (4'). The slide engagement end part (41'b) has a cylindrical slide end member (41'bE) which integrally projects outwards from both sides thereof in a symmetrical fashion relative thereto. Designation (41'E) denotes a base edge of this rotary male lock member (4), which is defined on the opposite sides of the lower slide engagement end part (41'b) as shown.

The cut-away mount area (44'), in the present mode, is embodied by cutting away a certain upper half area of the upper rail member vertical slide section (U1) and offsetting the remaining lower half area outwardly as shown in FIG. 6 to provide an offset mount section (44'F). Further, a support plate (44'A) is fixed by two rivets (44'AR) to the vertical slide section (U1) such as to extend along and in parallel with that offset mount section (44'F), whereupon a mount spacing (H) is defined therebetween. Designations (45')(45') denote a pair of bearing holes, each being concentrically formed in the respective offset mount section (44'F) and support plate (44'A). Also, designations (46)(46) denote a pair of stopper notches, each being formed in the same offset mount section (44'F) and support plate (44'A), respectively.

The above-described rotary male lock member (4') is mounted at the cut-away mount area (44') or in the mount spacing (H) of upper rail member (U), such that the pivotal base part (41'a) thereof is rotatably connected via a pin (43') to to the two holes (45'), the pin (43') being fixed integrally to the hole (41'aH) of male lock member (4'). Thus, the male lock member (4') is free to rotate about the central axis of pin (43') in a vertical direction between the offset mount section (44'F) and support plate (44'A), but the upward rotation of male lock member (4) is limited by engagement of the slide end member (41'bE) in both two stopper notches (46) (See FIG. 8).

A spiral spring (40') is provided for biasingly causing the male lock member (4') to rotate clockwise about the pin (43') so as to keep the slide end member (41'bE) in contact upon the bottom wall (L3) of lower rail member (L). The spiral spring (40') is fixed at its inward end to the pin (43') and secured at its outward end to the lug (44'Aa) of support plate (44'A).

It is to be appreciated that the rotary male lock member (4') may be mounted to the upper rail member (U) in the same longitudinal line therewith as if it was an integral part of the vertical slide section (U1) of upper rail member (U), and thus can be slidably set in and along the guide groove (L1) of long lower rail member (U), as understandable from FIG. 6.

The female temporary lock hole (5') is formed at a predetermined point of the bottom wall (L3) of lower rail member (L) which corresponds to the aforementioned home seating position (N). As understandable from FIGS. 6 and 8, the female temporary lock hole (5') is of a square shape to permit engagement and disengagement of the slide engagement end part (41'b) of rotary male lock member (4) therein and therefrom. Otherwise stated, the square female lock hole (5') has a length greater than the slide engagement end part (41'b) and a width greater than the whole length of the slide end member (41'bE) in order to permit that slide engagement end part (41'b) to be engaged therein and disengaged therefrom.

As shown in FIG. 7(A), a seat cushion/seat back locking mechanism (M2) may be arranged at the seat cushion (SC) of rear seat (RS) in an interlocking relation with the above-constructed temporary locking mechanism (M). The seat cushion/seat back locking mechanism (M2) is movably mounted at the planar lateral surface of side frame (1) and operatively connected to a reclining device (RD) provided between the seat cushion (SC) and seat back (SB). The reclining device (RD) is operable by its lever (103) to adjustably incline the seat back (SB) forwardly and backwardly relative to the seat cushion (SC). The seat cushion/seat back locking mechanism (M2) comprises a first lock device (180) and a second lock device (181). The first lock device (180) includes a rotary lock plate (180A) fixed at its base end to the shaft (7) of the seat cushion (SC), an arcuate guide hole (11) formed in the side frame (1), in which arcuate guide hole (11), a guide pin (6') is slidably fitted, and a cable wire (180B) having an elongated ring end (180Bc) in which an integral pin portion (180Aa) of the rotary lock plate (180A) is slidably engaged. The cable wire (180B) is connected at its end (180Bd) to a lug (103B) of the lever (103) associated with the reclining device (RD). On the other hand, the second lock device (181) includes an operation lever (181A), a slidable lock piece (181C), a link member (181B) which has one end pivotally connected to the operation lever (181A) and another end pivotally connected to the slidable lock piece (181C), and a projected lock portion (181D) formed in a rotatable frame (104) of the reclining device (RD). As shown, the connecting top portion (42') and its notch (42'a) of rotary male lock member (4') projects from the upper rail member (U) to a level where they are located midway in the arcuate guide hole (11), to thereby be ready for engagement with the guide pin (6'). The operation lever (181A) of second lock device (181) is biasingly caused by a spring (181S) to rotate downwardly to a lock position indicated by the solid line in FIG. 7(A), so as to keep the slidable lock piece (181C) contacted with the peripheral edge (104C) of reclining device rotatable frame (104). Under this state, since the projected lock portion (181D) has to immediately contact such lock piece (181C), the seat back (SB) of rear seat (RS) is limited and locked against backward inclination indicated by the two-dot chain line in FIG. 7(A).

The operation of the second embodiment of long slide rail device (LSR) will now be described hereinafter.

When it is desired to move the rear seat (RS) from the seating adjustment area (B) towards the storage lock position (LP), the lock device (D) may be operated, likewise as in the foregoing first embodiment, to unlock the upper rail member (U) from the long lower rail member (L), allowing the rear seat (RS) to be movable in the fore-and aft direction along the lower rail member (L). At this point, as can be seen from FIG. 7(B), the rotary lock member (4'), due to its being biased by the spiral spring (40') downwardly, is placed in a sliding relation with the lower rail member (L), with the slide end member (41'bE) thereof being biased into a slidable contact upon the bottom wall (L3) of lower rail member (L). Also, the seat cushion (SC) is set in the ordinary horizontal use position as in FIG. 7(A). In this seating adjustment area (B), the operation knob (181A) of the seat cushion/seat back locking mechanism (M2) is biased by the spring (181S) to an unlocking position indicated by the one-dot chain line in FIG. 7(A), so that the link member (181B) is retained in a position to draw the slide lock piece (181C) downwardly as indicated by the two-dot chain line in the same FIG. 7(A). Hence, the slidable lock piece (181C) is withdrawn away from the peripheral edge (108C) of reclining device rotatable frame (104), thereby avoiding a contact between that lock piece (181C) and projected lock portion (181D) formed in the reclining device rotatable frame (104), which allows rearward further inclination of the seat back (SB) as indicated by the two-dot chain line.

Now, when a passenger moves the rear seat (RS) to the home seating position (N), the upper rail member (U) is slidingly moved along the long lower rail member (L), with the slide end member (41'bE) of rotary lock member (4) being in a sliding contact on the bottom wall (L3) of long lower rail member (L). Then, upon the rear seat (RS) reaching the home seating position (N), as shown in FIG. 7(A), the slide end member (41'bE) is fallen downwards from the female temporary lock hole (5') formed in the bottom wall (L3), whereupon the rotary lock member (4') is rotated clockwise about the pin (43') under the biasing force of spiral spring (40'), bringing the slide engagement end part (41'b) thereof into a quick engagement in that temporary lock hole (5'), while the base edge (41'E) thereof is abutted against the bottom wall (L3) in the proximity of the temporary lock hole (5'). The rear seat (RS) is therefore locked temporarily at the home seating position (N) before being moved to the storage lock position (LP). After then, a passenger should depress the operation knob (181A) as shown in the solid line and arrow in FIG. 7(A) so as to bring the slidable lock piece (181C) into contact with the peripheral edge (180C) of reclining device rotatable frame (104), thereby placing the seat back (SB) in a state locked against rearward inclination from the seat cushion (SC). Next, as indicated by the arrow ①, as the seat cushion (SC) is rotated and folded about the shaft (7) towards the seat back (SB), the guide pin (6') is simultaneously moved from the upper end of arcuate guide hole (11) and slid downwards therealong, causing a clockwise rotation of the lock plate (180A) about the shaft (7). When the seat cushion (SC) is set in an upright folded state (see the two-dot chain line in FIG. 1), the guide pin (6') is engaged in the notch (42'a) of rotary male lock member (4'), and then further displacement and contacting of the same guide pin (6') to and with the lower end of guide hole (11) causes counterclockwise rotation of the rotary male lock member (4') about the pin (43') against the biasing force of spring (40'), whereupon the slide engagement end part (41'b) of rotary male lock member (4') is disengaged from the female temporary lock hole (5'), with the cylindrical slide end member (41'bE) fitted in the two stopper notches (46) formed in the support plate (44A) and offset support area (44'F). This completely keeps away the rotary male lock member (4) from contact with the bottom wall (L3) of long lower rail member (L), as seen from FIG. 8.

Accordingly, the rear seat (RS) is released from the temporarily locked state at the home seating position (N) and allowed to enter the "Fold Seat Cushion Upright" area (A). Finally, as the rear seat (RS) with its seat cushion (SC) folded upright is moved to and reaches the storage lock position (LP), the lock device (D) may be operated to lower the lock plate (80) to engage its three lock teeth (80b) in a predetermined set of three lock holes (90) defined at the storage lock position (LP), as shown in FIG. 8, thereby locking the seat (RS) at the storage point right behind the front seat (FS) as indicated by the two-dot chain line in FIG. 1.

In the second embodiment, the seat cushion (SC) thus folded upright to the seat back (SB) may be folded back to the horizontal use position as in FIG. 7(A) by rotating the lever (103) of reclining device (RD) as indicated by the arrow ① in FIG. 8. In that case, the cable wire (180B) is pulled as indicated by the arrow ② to cause the lock plate (180A) to rotate counterclockwise about the shaft (7), which in turn causes upward sliding of the guide pin (6) along the arcuate guide hole (11) as indicated by the arrow ③. Hence, the seat cushion (SC) is caused to rotate or fold back to the ordinary horizontal use position, while at the same time, the rotary male lock member (4') is rotated back under the biasing force of spring (40') to the state where its both slide engagement end part (41'b) and cylindrical slide end member (41'bE) are kept in contact upon the bottom wall (L3) of lower rail member (L). It is noted that the cylindrical slide end member (41'bE) has a length greater than the width of each lock hole (90) to avoid a dragging engagement of the slide engagement end part (41'b) in the lock hole (90).

As described above, it is appreciated that in accordance with the present invention, the following advantages are attained:

(I) According to the temporary locking mechanism (M), the male lock means as designated by (4) or (4') lies along the longitudinal body of the upper rail member (U) in a symmetrically less projected manner relative to the vertical slide section (U1) thereof, and thus can be easily accommodated within the long lower rail member (L), whereas the female lock means as designated by (5) or (5') is defined at the bottom wall (L3) of long lower rail member (L), without interference with the sliding movement of the upper rail member (U). This effectively makes small and simplified the whole structure of the temporary locking mechanism (M), thus eliminating the need to prepare other complicated sub rail assembly for effecting the temporary locking at the home seating position (N) as found in the prior art.

(II) The male lock means as designated by (4) or (4') is provided with a top connecting portion (42 or 42') which projects from the lower rail member (L) to a point where another seat cushion and/or seat back locking mechanism (M1 or M2) is located. This advantageously allows operative connection of the temporary locking mechanism (M) with such another locking mechanism (M1 or M2) to materialize an optimal temporary locking of the rear seat (RS) insuring to draw the passenger's attention to the necessity for folding upright the seat cushion (SC) at the predetermined point (N) before displacing the rear seat (RS) to the storage lock position (LP). In this respect, such another locking mechanism (M1 or M2) may be arranged in a flat or less projected fashion within the coplanar surface of side frame (1), as shown, which will also make small or compact the structure of the same (M1 or M2).

While having described the present invention thus far, it should be understood that the invention is not limited to the illustrated embodiments, but any other modifications, replacements and additions may be structurally applied thereto without departing from the scopes of the appended claims. Of course, the invention may be applied to only one seat provided in a vehicle, instead of the rear seat (RS) provided behind the front seat (FS). Instead of the seat cushion/seat back locking mechanism (M1 or M2), other operation lever or operation mechanism may be connected with the top connecting portion (42 or 42') of rotary male locking member (4 or 4'), as desired, for sole operation of the temporary locking mechanism (M).

What is claimed is:

1. In combination with a vehicle and a seat slidable on a floor of the vehicle, the seat including a seat back and a seat cushion foldable upright toward the seat back, a long slide rail device for use in said vehicle and seat, comprising:

a long lower rail means fixed in the floor of said vehicle, said long lower rail means including a bottom wall disposed at a side of said floor of vehicle;

a predetermine point defined in said vehicle, at which said predetermined point, said seat cushion of said seat must be folded upright toward said seat back of same seat to permit said seat to be slide past said predetermined point;

an upper rail means fixed to a side of said seat cushion, said upper rail means being slidably fitted in said long lower rail means; and a locking means for locking and unlocking said upper rail means to an from said long lower rail means at a position corresponding to said predetermined point and permitting said seat to be slid past said predetermined point only when said seat cushion is folded upright, said locking means including;

a female lock means provided at the bottom wall of said long lower rail means and disposed there at a point corresponding to said predetermined point;

a male lock means which mounted on said upper rail means to be movable in a vertical direction to and from the bottom wall of said long lower rail means, wherein the male lock means is normally retained toward the bottom of said long rail means, wherein the male lock means, upon reaching said female lock means, is automatically engaged therewith to stop sliding movement of said upper rail means along said lower long rail means at said position corresponding to said predetermined point, said seat cushion being foldable upright toward said seat back at said predetermined point, wherein the male lock means engaged with the female means is moved upwardly from the bottom wall of said long lower rail means and released from the female lock means when said seat cushion is folded upright to allow further sliding movement of the upper rail means from said position corresponding to said predetermined point, wherein the seat may be slid with the seat back folded upright to the seat cushion past said predetermined point.

2. The long slide rail device as defined in claim 1, wherein said male lock means is so arranged at said upper rail means as to lie generally along a longitudinal direction of said upper rail means and be accommodated generally within said lower rail means.

3. The long slide rail device as defined in claim 1, wherein said predetermined point is defined between a storage lock position wherein said seat is to be stored and locked, with the seat cushion thereof folded upright, and a seating adjustment area where said seat is to be moved for adjustment in position in a fore-and-aft direction of said vehicle, wherein said locking means is a temporary locking mechanism for temporarily locking said seat at said predetermined point before displacing said seat to said storage locking position, and wherein said temporary locking mechanism is so arranged between said upper and long lower rail means that said male lock means is normally retained downwardly toward the long lower rail means bottom wall such as to be positioned at a level for engagement with said female lock means at said position corresponding to said predetermined point, and wherein, the male lock means may be moved upwardly to a level out of engagement with said female lock means.

4. The long slide rail device as defined in claim 1, wherein said male lock means further comprises a connecting means for allowing operative connection of said male lock means with a seat cushion locking means for locking and unlocking said seat cushion to and from a normal horizontal use position, wherein, when said male lock means is engaged with said female lock means at said predetermined point, said seat cushion locking means is operable to unlock said seat cushion from said normal horizontal position, so that the seat cushion may be folded upright towards said seat back, and when said seat cushion is folded upright to said seat back, said seat cushion locking means acts on said connecting means of said male lock means so as to allow the male lock means to be disengaged from said female lock means.

5. The long slide rail device as defined in claim 1, wherein said upper rail means includes a vertical slide section slidably fitted in said long lower rail means, wherein a cut-away area is formed in said vertical slide section, and wherein said male lock means is arranged in said cut-away area such as to-lie generally within a height-wise width of and along a longitudinal direction of said vertical slide section of said upper rail means and further rotatable vertically in said cut-away area in the vertical direction along said vertical slide section to and from said bottom wall of said long lower rail means.

6. The long slide rail device as defined in claim 5, wherein said male lock means is pivotally connected at said cut-away area of said vertical slide section associated with said upper rail means and so configured as to hang over said cut-way area and extend adjacently along two opposite sides of said vertical slide section, terminating in a pair of slide ends for a slidable contact upon the bottom wall of said long lower rail means.

7. The long slide rail device as defined in claim 5, wherein said female lock means comprises a generally U-shaped female lock member fixed on said bottom wall of said long lower rail means at said point, said generally U-shaped female lock member each having a pair of spaced-apart engagement edges, each being to be engaged with the respective said pair of slide ends associated with said male lock means.

8. The long slide rail device as defined in claim 5, wherein said male lock means is pivotally connected at said cut-away area of said vertical slide section associated with said upper rail means and so configured as to have a slide end at a lower end thereof for a slidable contact upon the bottom wall of said long lower rail means.

9. The long slide rail device as defined in claim 8, wherein said female lock means comprises a female lock hole formed in said bottom wall of said long lower rail means, in which female lock hole, said slide end of said male lock means is to be engaged.

10. The long slide rail device as defined in claim 1, said vertical slide section extending toward the bottom wall of said long lower rail means, wherein a cut-away area is formed in said vertical slide section, and wherein said male lock means is pivotally mounted at said cut-away area and further provided at the upper side thereof with connecting means for allowing operative connection with a seat cushion locking mechanism for locking said seat cushion in a normal horizontal use position and unlocking said seat cushion therefrom when said male lock means is locked to said female lock means at the position corresponding to said predetermined point, wherein said seat cushion can be folded upright towards said seat back at said predetermined point.

11. The long slide rail device as defined in claim 10, wherein said male lock means is so configured as to hang over said cut-away area and extend adjacently along two opposite sides of said vertical slide section, terminating in a pair of slide ends for a slidable contact upon the bottom wall of said long lower rail means.

12. The long slide rail device as defined in claim 11, wherein said female lock means comprises a generally U-shaped female lock member which is provided fast on said bottom wall of said long lower rail means at said position, said generally U-shaped female lock member having a pair of spaced-apart engagement edges, each being to be engaged with the respective said pair of slide ends associated with said male lock means.

13. The long slide rail device as defined in claim 10, wherein a biasing means is provided at said cut-away area to bias said connecting means of said male lock means to a position for operative connection with said seat cushion locking mechanism, with such an arrangement that unlocking operation of said seat cushion locking mechanism allows said male lock means to be brought out of engagement with said female lock means, at said position, under a biasing force of said biasing means.

14. The long slide rail device as defined in claim 10, wherein said seat includes a side frame to which said upper rail means is fixed, and wherein said seat cushion locking mechanism is disposed in said side frame.

15. The long slide rail device as defined in claim 10, wherein said seat cushion locking mechanism includes an inter locking means between said seat cushion and said connecting means of said male lock means, such that, when said seat cushion is set in said normal horizontal use position, the interlocking means acts on said connecting means so as to retain said male lock means in a condition for engagement with said female lock means until said seat cushion is folded upright, at said predetermined point, towards said seat back, and when said seat cushion is folded upright towards said seat cushion at said point, the interlocking means is inactive to said connecting means, allowing disengagement of said male lock means from said female lock means.

16. The long slide rail device as defined in claim 15, wherein said connecting means comprises a top connecting portion of said male lock means and said interlocking means comprises a rotary lock plate rotatable together with said seat back in a direction towards and away from said top connecting portion of said male lock means, with such an arrangement that, when said seat cushion is set in said normal horizontal use position, said rotary lock plate contacts said top connecting portion to retain said male lock means in the condition for engagement with said female lock means, and when said seat cushion is folded upright towards said seat back, said rotary lock plate is rotated in a direction out of contact with said top connecting portion to allow disengagement of said male lock means from said female lock means.

17. The long slide rail device as defined in claim 10, said male lock means is so configured to have a slide end defined at a lower end thereof for a slidable contract upon the bottom wall of said long lower rail means, and wherein said female lock means is defined in said bottom wall of said long lower rail means at a point corresponding to said predetermined point, wherein said female lock means comprises a female lock hole formed in said bottom wall of said long lower rail means in which female lock hole, said slide end of said male lock means is to be engaged.

18. The long slide rail device as defined in claim 17, wherein a biasing means is provided for biasing said male lock means towards a direction in which said slide end of said male lock means is retained in a slidable contact on said bottom wall.

19. The long slide rail device as defined in claim 1, wherein said male lock means is provided with a connecting means for allowing operative connection of said male lock means with a seat cushion/seat back locking means for locking and unlocking said seat cushion to and from a normal horizontal use position and further locking said seat back against rearward inclination from a normal upright position, with such an arrangement that, when said male lock means is engaged with said female lock means at said position corresponding to said predetermined point, said seat cushion/seat back locking means is operable to unlock said seat cushion from said normal horizontal use position to permit folding upright of said seat cushion towards said seat back, while locking said seat back against rearward inclination from said normal upright position, and when said seat cushion is folded upright to said seat back, said seat cushion/seat back locking means acts on said connecting means of said male lock means so as to allow the male lock means to be disengaged from said female lock means.

* * * * *